United States Patent [19]
Zinck

[11] 3,773,112
[45] Nov. 20, 1973

[54] MOTOR OPERATED HAND HOE

[76] Inventor: Eugen Zinck, Huffelsheimer Str. 2, Bad Kreuznach, Germany

[22] Filed: Feb. 11, 1970

[21] Appl. No.: 10,429

[52] U.S. Cl. .................. 172/42, 172/49, 172/116
[51] Int. Cl. ............................................. A01b 33/00
[58] Field of Search .................. 172/35, 37, 41, 42, 172/48, 49, 36, 114, 115, 116, 118, 123, 172/540, 177, 256; 64/28, 29; 180/19; 280/47.11; 74/495; 15/49 C, 50 C, 411

[56] References Cited
UNITED STATES PATENTS

| 1,220,104 | 3/1917 | Hanten | 74/495 |
|---|---|---|---|
| 2,235,044 | 3/1941 | Ronning | 280/47.11 |
| 2,485,057 | 10/1949 | McCormick | 172/532 |
| 1,754,617 | 4/1930 | Esch et al. | 172/256 |
| 2,038,697 | 4/1936 | Winslow | 280/47.11 |
| 2,162,313 | 6/1939 | McCabe et al. | 280/47.11 |
| 1,849,218 | 3/1932 | Beach | 15/49 C |
| 3,624,861 | 12/1971 | Freiheit | 15/50 C X |
| 2,691,928 | 10/1954 | Kelsey et al. | 172/42 |
| 2,823,597 | 2/1958 | Kelsey | 172/103 |
| 2,888,994 | 6/1959 | Hoff et al. | 172/103 |
| 2,967,579 | 1/1961 | Howard | 172/42 |
| 3,576,216 | 4/1971 | Tanke | 172/604 |
| 2,643,599 | 6/1953 | Wharton | 172/49 |
| 2,948,345 | 8/1960 | Brewster | 172/49 |
| 3,123,149 | 3/1964 | White | 172/42 |
| 2,576,605 | 11/1951 | Hupp | 172/42 |
| 3,122,208 | 2/1964 | Gunn et al. | 172/42 |
| 2,893,497 | 7/1959 | Vellenzer | 172/42 |
| 1,104,211 | 7/1914 | Meredith-Jones | 64/29 |
| 1,274,722 | 8/1918 | Lacey | 64/29 |
| 2,881,602 | 4/1959 | Baker et al. | 64/29 |
| 3,036,447 | 5/1962 | Wilhelmsson et al. | 64/29 |
| 1,300,442 | 4/1919 | Matoushek | 64/29 |
| 1,701,638 | 2/1929 | Rowland | 172/42 |
| 2,777,374 | 1/1957 | Kinsey | 172/42 |
| 3,128,831 | 4/1964 | Arndt | 172/42 |

FOREIGN PATENTS OR APPLICATIONS

| 132,236 | 4/1925 | Switzerland | |
| 6,500,499 | 7/1965 | Netherlands | 172/42 |
| 1,356,467 | 12/1964 | France | 172/42 |
| 1,048,060 | 12/1958 | Germany | 172/42 |
| 678,184 | 11/1966 | Belgium | 172/42 |
| 157,900 | 7/1954 | Austria | 172/42 |
| 1,061,549 | 7/1959 | Germany | 172/540 |
| 292,217 | 7/1965 | Netherlands | 172/123 |
| 6,500,500 | 7/1965 | Netherlands | 172/123 |
| 1,494,231 | 11/1967 | France | 172/123 |
| 257,010 | 5/1963 | Austria | 172/42 |
| 1,059,637 | 3/1954 | France | 172/49 |

Primary Examiner—Robert E. Pulfrey
Assistant Examiner—Stephen C. Pellegrino
Attorney—Walter Becker

[57] ABSTRACT

A motor operated hand hoe in which the advancing speed, working direction, and hoeing depth is controlled by varying the load exerted upon the soil by the hoe tools associated with one shaft and the load exerted upon the soil by the hoe tools associated with another shaft in conformity with the desired work result.

5 Claims, 20 Drawing Figures

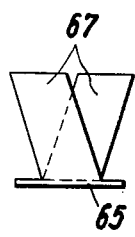
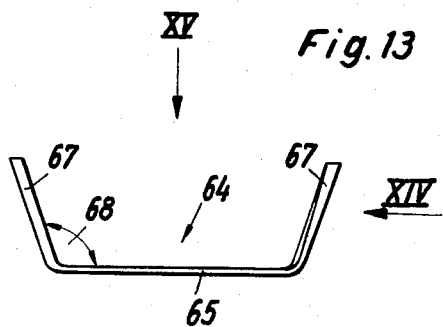
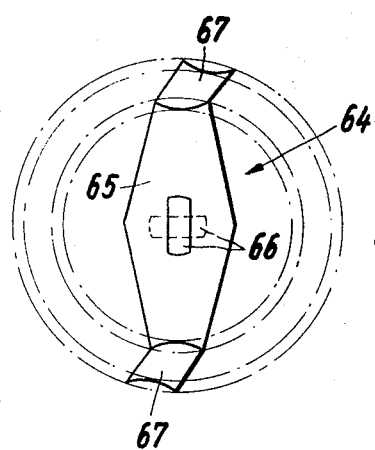
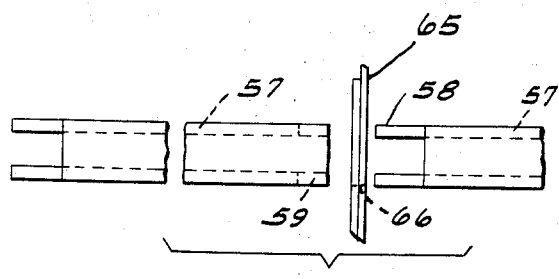

MOTOR OPERATED HAND HOE

The present invention relates to a motor hoe with a handle, a driving shaft for supporting working tools, and with a motor arranged above the tools.

It is an object of the invention to provide a motor operable hand controlled hoe which will be self cleaning, will not clog up and will work free from trouble while making it possible solely by the handle, in other words without adjusting the hoe tools and also without reversing the direction of rotation of the hoe, to determine the working direction of the hoe.

It is another object of this invention to provide a hoe as set forth in the preceding paragraph, which can easily be handled.

These and other objects and advantages of the invention will appear more clearly from the following specification in connection with the accompanying drawings, in which.

Figure 3:
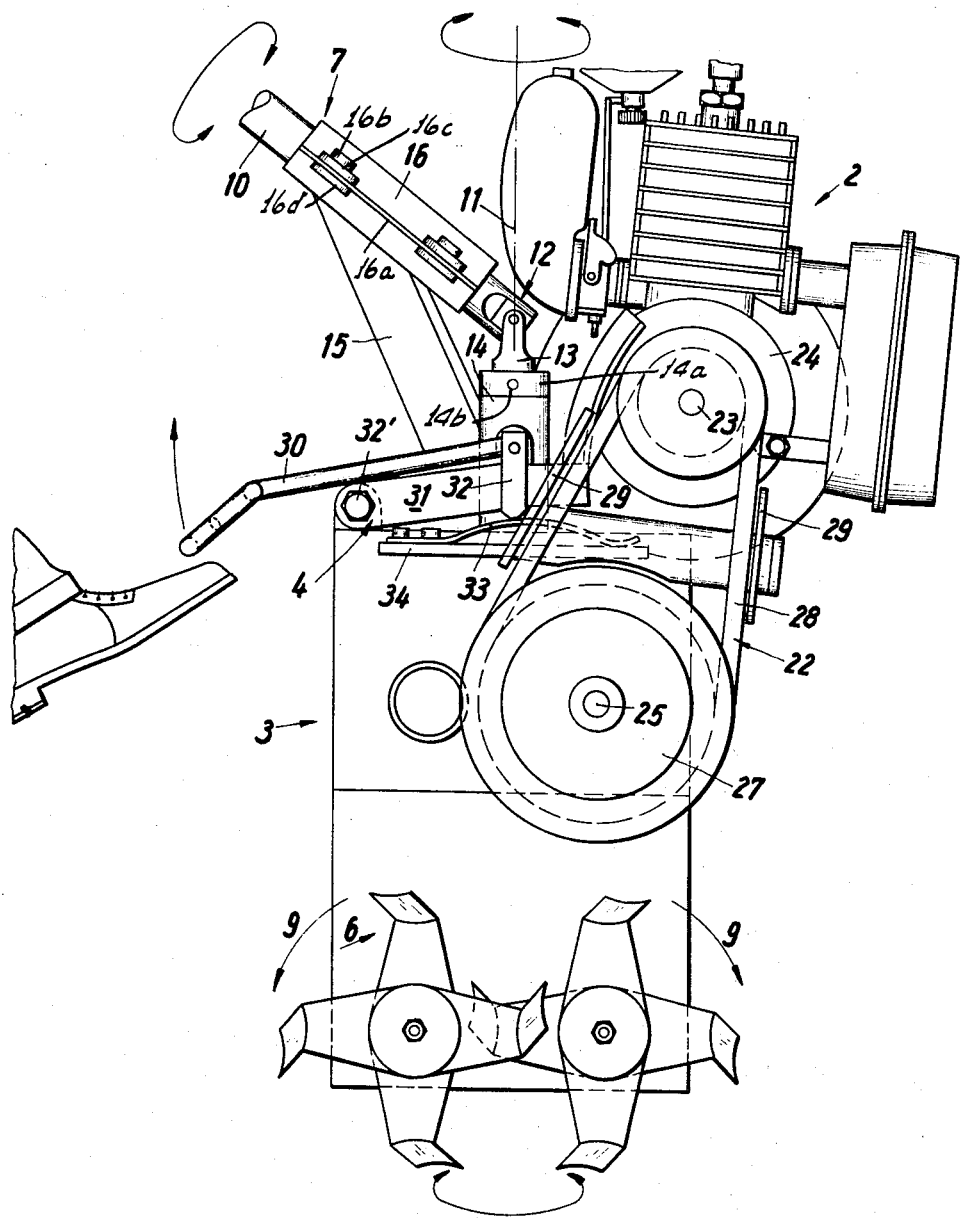
FIG. 3 illustrates on a larger scale than FIGS. 1 and 2 a side view of a cutout of the hoe shown in FIG. 1.
Figure 3A:
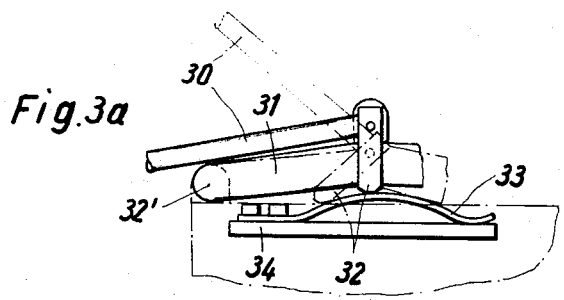

FIG. 3a in a representation similar to FIG. 3 shows a release device for the belt drive forming part of the driving connection between the motor and the transmission.

Figure 4:
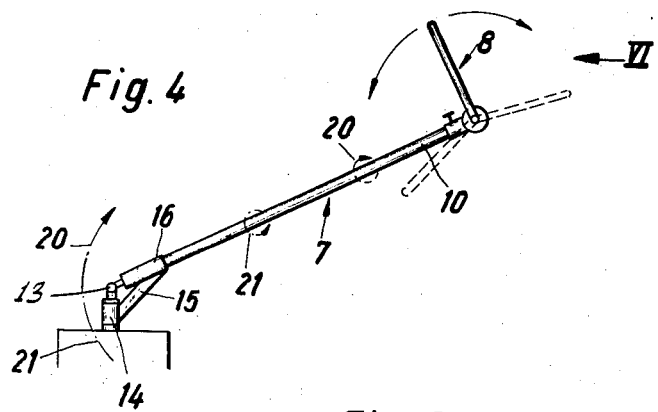
Figure 5:
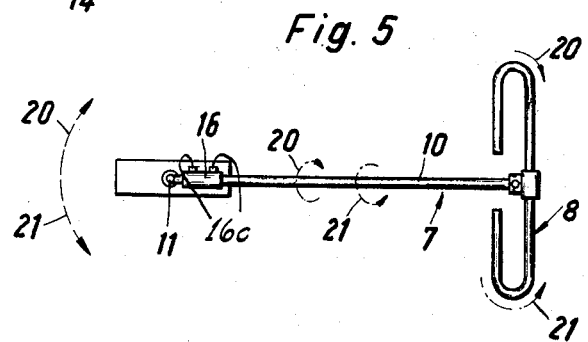
Figure 6:
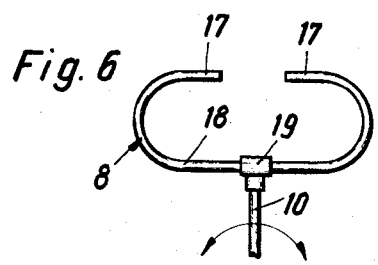

FIGS. 4 – 6 respectively illustrate different positions of the handle associated with the steering device.

Figure 7:
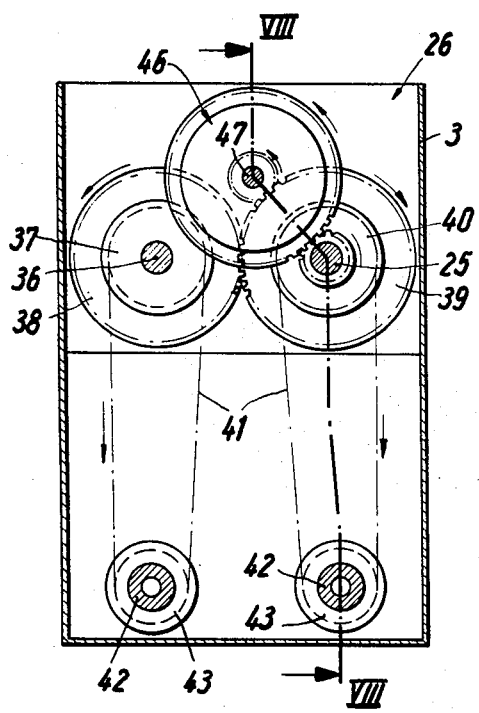

FIG. 7 is a view of the transmission located in a transmission housing and rotating in an oil bath, after removal of one of the side walls of said transmission housing.

Figure 8:
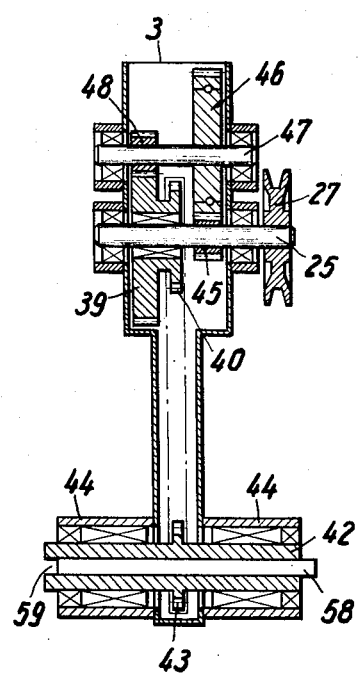

FIG. 8 represents a section along the line VIII — VIII through the transmission of FIG. 7.

Figure 9:
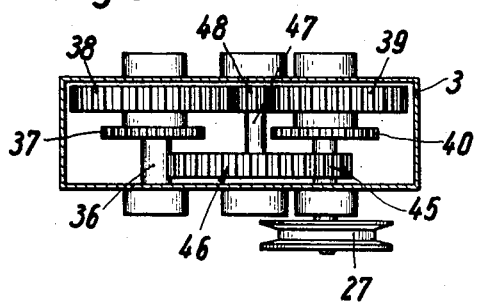

FIG. 9 is a top view of the transmission illustrated in FIG. 7.

Figure 10:
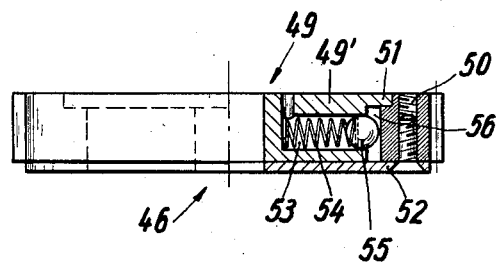

FIG. 10 illustrates partially in section a gear which forms an overload safety device in the transmission.

Figure 11:
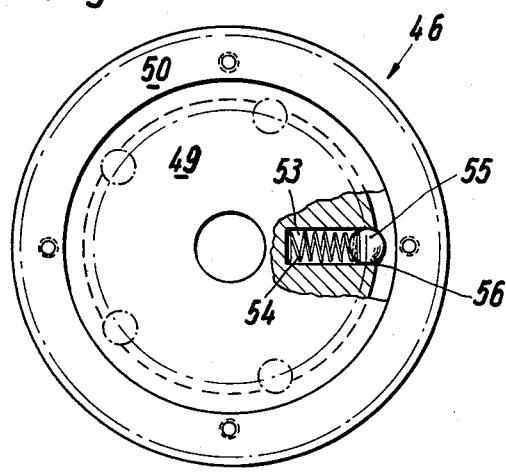

FIG. 11 is a side view of the gear according to FIG. 10.

Figure 12:
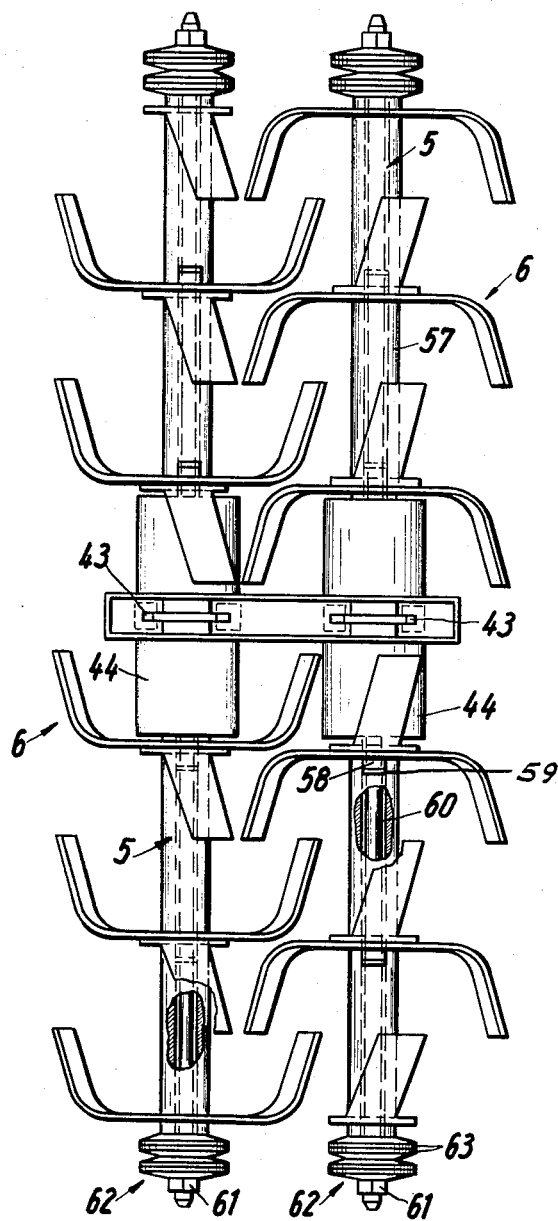

FIG. 12 is a top view of the shafts carrying the hoe tools, in combination with a horizontal section through the transmission housing within the region of these shafts.

FIG. 13 is a side view of one of the hoe tools.

FIG. 14 is a view of the hoe tool according to FIG. 13 as seen in the direction of the arrow 14.

FIG. 15 is a top view of the hoe tool according to FIG.13 as seen in the direction of the arrow 15.

FIG. 15a is an exploded fragmentary view illustrating the assembly of the shaft elements and hoe tools.

Figure 16:
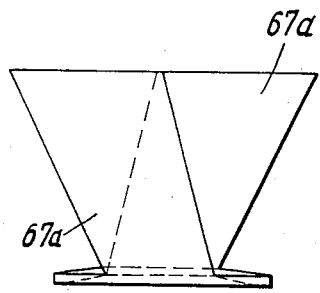
Figure 17:
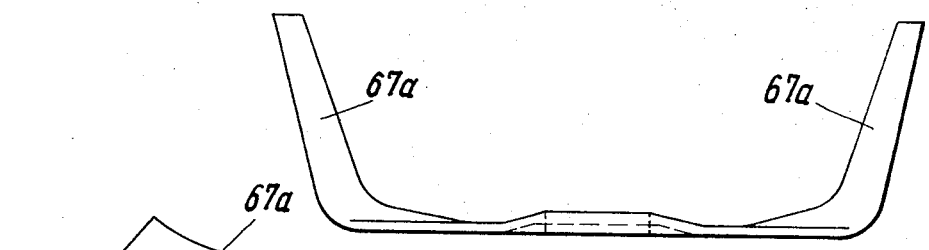
Figure 18:
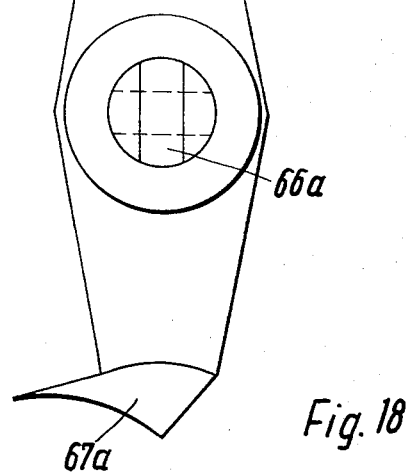

FIGS. 16–18 illustrate in end view, side view and top view a hoe tool slightly modified over that of FIGS. 13–15.

The motor hoe according to the present invention is characterized primarily in that one shaft has associated therewith a second shaft for carrying the tools, which second shaft extends substantially parallel to said first shaft and is driven in the opposite direction to the direction of rotation of said first shaft. The motor hoe according to the invention is furthermore characterized in that the advancing direction of the hoe is adapted to be determined by changing the ratio of the load acting on the ground between the tools associated with the first shaft and the tools associated with the second shaft.

By designing the hoe in conformity with the above mentioned features it is possible to hoe in forward and backward direction without reversing or readjusting the machine. It is merely necessary by varying the load exerted upon the ground, to change the ground resistance for the tools associated with one shaft relative to the tools associated with the second shaft. The hoe works in the respective direction in which it is advanced by the tools which are under the greater load and thus work against a higher ground resistance. The higher load of a row of tools, i.e. of the tools associated with one shaft may make itself felt in a greater ground penetration by said tools which, however, also depends on the hardness of the ground to be worked. With the design according to the present invention, it is possible in a simple manner to maintain a uniform working depth and working speed. This is possible with the design according to the invention in spite of a low hoe weight, because in particular with interengaging tools of both shafts, i.e. tools with overlapping moving paths, and with a drive for said shafts in which the tools in their overlapping region move upwardly, a biting effect in the direction toward the ground is exerted which will assure an entering of the tools into the ground even at a relatively low weight of the machine. In view of the said biting effect, as a result of which, the hoe is pulled toward the ground in addition to being pressed thereagainst by its own weight, the hoe according to the invention will even at low ground penetration of from one to three centimeters operate very quietly so that the hoe according to the invention represents a genuine nursing hoe which will bring about an effective destruction of the weed and a fine breaking up of the soil surface. The effective destruction of the weed will be particularly advantageously felt with nursing work. In particular, the favorable exploitation of the driving power in combination with the quiet operation of the hoe according to the invention makes possible high working speeds of from approximately 0.8 to 1.2 meters per second. In view of the low power requirement, the hoe according to the invention is particularly light and can easily be handled.

According to a further development of the invention, the shafts which carry the tools and extend from a central mounting toward both sides free and outwardly are elastically yieldably designed in a direction transverse to the longitudinal direction of said shafts whereby the danger of jamming and damaging of the machine is considerably reduced. This is due to the fact that, for instance, the shafts will be able to laterally deviate when the hoe tools hit larger rocks. In view of the safety of the machine it is further important that in the drive from the motor to the transmission and, more specifically, to the splitting up of the drive in the transmission, there is provided an overload safety means.

The drive from the motor to the transmission is, according to a preferred arrangement of the invention, effected by a V-belted drive which, in view of the subsequent transmission, has only a small step-down ratio so that in conformity with the invention large diameter pulleys may be employed for the V-belt drive. In view of these large pulleys, an unfavorable load will not be exerted upon the V-belt. In view of the fact that according to the invention the motor is mounted so as to be pivotable relative to the transmission housing, it is possible by pivoting the motor toward the transmission housing to interrupt the drive from the motor to the transmission so that a special coupling or clutch will not be necessary. This feature in combination with the other features referred to above result in a particularly simple and strong construction.

According to a further development of the invention the hoe cannot only be handled by the handle means associated therewith, but can also be steered. To this end, the handle means is pivotally mounted for pivoting about a vertical axis relative to the transmission housing, and in addition thereto is rotatable about the longitudinal axis of its longitudinal arm while being connected through a universal joint with the transmission housing. This steering device according to which the pivot axis for the handle means is preferably located in a plane which is symmetrical to the shafts carrying the hoe tools, makes it possible from the respective working direction to move toward the right or left, for instance, between spaced bushes, without the necessity of having to pivot the handle means which in many instances in which rows of plants are nursed would make the employment of customary motor hoes impossible without the necessity that the operator changes its stand inasmuch as the hoe according to the invention turns on the spot during the steering operation.

Figure 1:
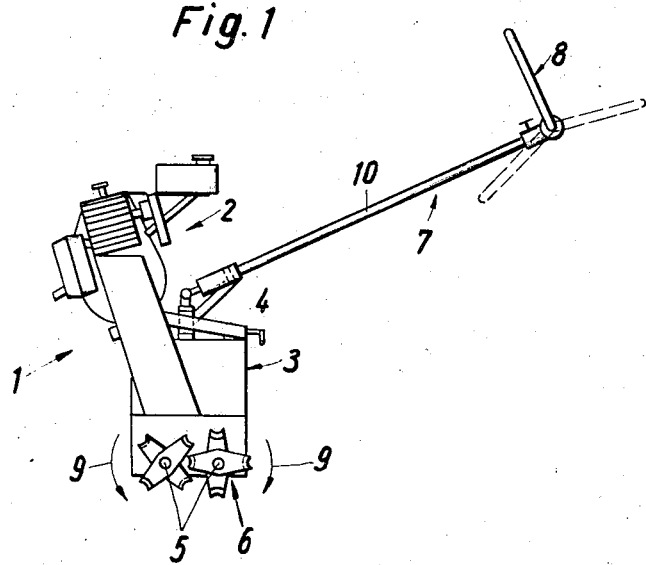
FIG. 1 is a side view of a manually guidable hoe without wheels.
Figure 2:
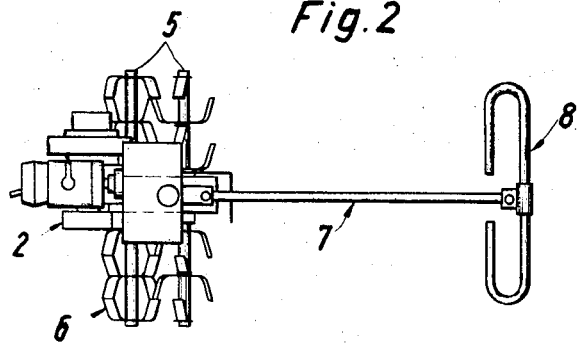
FIG. 2 is a top view of the hoe according to FIG. 1.

Referring now to the drawings in detail, the hoe 1 illustrated in FIGS. 1 to 3 is equipped with a motor 2 which in the particular embodiment shown is formed by an internal combustion engine. It is, of course, also possible for driving the hoe according to the invention to employ an electrically driven motor, especially since with the design of the hoe according to the invention, only a motor power is required which over heretofore known solutions is extremely low. Thus, when the hoe is employed as nursing hoe, a battery-driven motor of approximately 0.25 horsepower with a working width of 55 centimeters has proved fully sufficient. The motor 2 is supported by a transmission housing 3, the lower portion of which, houses the shafts 5 for the hoe tools 6. The shafts 5 extend parallel to the output shaft of the motor (not shown in FIG. 1) so that angle drives are not necessary.

The motor 2 is supported relative to the transmission housing 3 by an arm 4 by means of which the spacing between the motor 2 and the transmission housing 1 may be varied. This is advantageous in view of the drive connection according to the invention which will be described in detail further below.

With the hoe 1 according to the invention there are, as shown in the drawing, provided two shafts 5 which are parallel to each other and support the hoe tools 6. Shafts 5 have the same length and extend over the same distances at both sides of the transmission housing. The spacing of the shafts 5 from each other is so selected that the hoe tools 6 which are of the same size and are arranged on said shafts have their path of movement overlap each other so that the tools 6 which correspond to each other and pertain to the two shafts which are located in the same planes perpendicular to the shafts 5 will during their synchronous movement interengage and thereby prevent a clogging up with long stem material which may get wound around the shafts. Within the framework of the present invention, also a non-synchronous rotation or drive of the hoe tools is possible even though such drive leads to a somewhat complicated construction. Furthermore, it is possible according to the invention to drive the two shafts in such a way that the tools will, within their overlapping range, move downwardly, which may be advantageous for deep hoeing. By employing specific blade forms, with shafts driven in the manner outlined above, it is possible to employ the hoe also for other purposes, as, for instance, for surface hoeing or mulching, and weed cutting.

The direction of rotation of the shafts 5 or the hoeing tools 6, which direction of rotation is indicated in FIG. 1 by the arrows 9, is opposite to each other and, more specifically, so that the hoeing tools in their overlapping range move upwardly.

With the design of the hoe 1 according to the invention, hoeing tools 6 may be employed which in comparison to the heretofore known hoes have small diameters. The overlapping paths of the tools employed in the illustrated hoe have in practice a diameter of approximately 120 millimeters while the shafts 5 are spaced from each other approximately 85 millimeters. As a result of this design, when employing the hoe according to the invention as nursing hoe, particularly satisfactory working results are obtained.

The illustrated hoe 1 according to the invention is, as indicated in the drawings, without wheels and when in working operation rests on the ground merely by the hoeing tool 6. The drive of the hoe 1 is thus effected through the tools 6 while the working direction of the hoe is adapted to be determined by guiding the hoe by means of the handle 7 so that the hoeing tools 6 which move through the ground in a direction counter to the desired working direction are subjected to a greater load than the tools which move through the soil in a working direction. This can be realized in a simple manner by a corresponding setting of the hoe 1 relative to the ground. To this end it is merely necessary that the operator lifts or lowers the handle means 7 which is not pivotable in the direction of height relative to the transmission housing 3 or the motor 2. If it is desired to hoe deeper, the handle means 7 may by the operator be held in an intermediate position in which the oppositely directed forward driving forces of the hoe tools associated with the two shafts 5 balance each other, so that the hoe tools are substantially uniformly loaded and consequently oppositely directed forward driving forces of substantially the same magnitude are produced.

The hoe according to the invention is, by means of the handle means 7, adapted to be pivoted to different heights by displacing the weight, not only in the manner required for determining the working direction but can additionally also be steered. The steerability is not limited to a guiding according to which the hoe works always in a driving direction corresponding to the longitudinal direction of the handle means 7 as this is the case with heretofore known designs. In view of the design of th linking of the handle means 7 relative to the transmission housing 3, as shown in FIGS. 3 – 6, it is also possible with a hoe according to the present invention, to work transverse to the longitudinal extension of the handle means 7 as is desirable when nursing tomatoes, when cultivating grapes, and when cultivating bushes and the like. To this end the hoe is steered by turning the handle means about the central longitudinal axis thereof.

To this end and in conformity with the present invention, the longitudinal bar 10 of the handle means is adapted to be pivoted relative to the transmission housing 3 about a vertical axis 11. This pivoting movement is brought about by the turning of the longitudinal arm 10 about its central longitudinal axis through a universal joint 12 (FIG. 3) which universal joint is connected to the arm 10 and the transmission housing 3 and the central point of which is located in the axis 11. The universal joint 12 is connected to the transmission housing 3 by means of a pivot 13 fixed to housing 3, the longitudinal central line of which coincides with the axis 11 which latter is preferably located in a plane to which the hoe tools 6 or shafts 5 are symmetrically located. A bushing 14 which is held non-displaceable in vertical direction by collar 14a fixed to pivot 13 by pin 14 b is rotatable in a manner not illustrated about the pivot 13. The bushing 14 carries by means of a supporting arm 15 guiding means 16 for the longitudinal arm 10 of the handle means 7 which guiding means is formed by a clamping bushing. In this clamping bushing 16 the longitudinal arm of the handle means 7 is normally rotatably guided. The easiness in the steering can be adjusted by the respective degree of tensioning of the split clamping bushing 16 with regard to the longitudinal arm 10 by the screws 16b passing through ears 16c and 16d on opposite sides of slit 16a. If, as may be desirable for the preparation of seed beds, only a straight working of the hoe is desired, the clamping bushing 16 may be tightened by screws 16c and 16d so as to block the steering so that the longitudinal arm 10 is no longer rotatable in said bushing.

That end of the longitudinal arm 10 which is remote from the universal joint 12 is provided with a handle part 8 (FIGS. 1 and 4 to 6) which is formed by a yoke with a straight web and with U-shaped ends 17. The yoke-shaped handle part 8 is non-rotatable relative to the longitudinal arm 10 with regard to the longitudinal axis thereof. The connection of the yoke-shaped handle part 8 with regard to the longitudinal arm 10 is effected by means of a bushing 19 which extends perpendicular to the longitudinal axis of arm 10 and in which the web 18 is guided. The handle part 8 is pivotable about the central line of the web guided in bushing 19 so that different handle heights can be set in conformity with the height of the operator. The locking of the handle part 8 in the respective position of height is effected by clamping the web 18 relative to the bushing 19. To this end, the bushing 19 may likewise be designed in the form of a clamping bushing.

By turning the handle means rotatable in the guiding means 16 by means of the handle part 8, it is made possible to tilt the hoe proper into a working position transverse to the longitudinal direction of the longitudinal arm 10 so that the operator without changing his position, in other words so to speak directly from his standing position, will be able also to work in a direction transverse to the respective main working direction. The hoe proper consists of the motor, the transmission and the tool carrying shafts journalled therein.

The direction of rotation of the handle part 8 about the longitudinal arm 10 brings about a tilting movement in the same direction of the hoe proper about the axis 11 and relative to the longitudinal axis of the arm 10 so that a right-hand steering movement on the handle part 8, in other words a rightward turning movement, will pivot the hoe toward the right and, correspondingly, a leftward turning movement of the handle part 8 will bring about a pivoting movement of the hoe toward the left. In FIGS. 4 and 5 the respective steering movements toward the right are indicated by corresponding arrows 20, whereas the steering movements toward the left are indicated by the arrows 21.

As will be evident in particular from FIG. 3, the driving connection between the motor 2 and the transmission housing 3 is preferably effected by a V-belt transmission 22. This V-belt transmission comprises a pulley 24 mounted on the output shaft 23, a pulley 27 mounted on the input shaft 25 of the transmission 26 (FIG. 7) and a V-belt 28. The V-belt 28 has along the outside of its sections extending between the pulleys 24 and 27 associated therewith flat supports 29. These supports 29 will when the belt 28 is tensioned be located at a slight distance from the outside of the belt sections between said pulleys 24 and 27. The tension of the V-belt is brought about by pivotally connecting the motor 2 with regard to the transmission housing 3 through a rocker or arm 4, and further by resiliently supporting the motor against the tension of the V-belt. The linking of the rocker 4 to the transmission housing 3 is effected in the vicinity of the rear side of the transmission housing which extends parallel to the shafts 5 carrying the hoe tools 6. The V-belt drive 22 is located adjacent the front side of housing 3 so that at a slight tilting movement of the motor 2 relative to the transmission housing 3 a sufficient adjusting stroke is obtained in order to interrupt the drive by interrupting the belt tension, and by tensioning the belt to re-establish the driving connection.

The pivoting movement of the rocker 4 or of the motor 2 relative to the transmission housing may be effected by a lever 30 which is journalled on one of the pivoting arms 31 of the rocker 4 and which is non-rotatably connected to a cam 32. By means of the cam 32 it is possible to actuate a leaf spring 33 which is connected to a support 34 located laterally of the transmission housing 3 and which in the particular embodiment shown is convexly arched toward the cam and has its end supported by the support 34. When the cam 32 is pivoted into a position substantially parallel to the arm 31, for instance, by means of a foot-operated lever 30, the motor 2 is lowered toward the transmission housing 3 and the belt 28 engages the pulleys 24 and 27 without tension. The power transfer from motor 2 to the transmission 26 is thus interrupted. A placing of the belt 28 upon the pulley 24 in view of its own weight is in this disengaging position in which the belt 28 extends around the pulleys 24 and 27 without tension prevented by the supports 29 engaged by the belt 28 within the region of those sections which are free between the pulleys inasmuch as V-belts in their tension-free condition have the tendency to assume the shape of a circle. The position of the cam 32 occupied by the latter when the drive is interrupted and the motor 2 is lowered toward the transmission housing is illustrated in FIG. 3a by dot-dash lines. If the driving connection is to be re-established, it is merely necessary to pivot the lever 30 from its dot-dash line position in FIG. 3a to the starting position in FIG. 3. As a result of such pivoting movement, the cam 32 is returned to its tensioned position in which starting from its slack position according to FIG. 3a it is pivoted slightly beyond its dead center position so that an automatic unlocking is not possible. In view of the resilient support of the cam, changes in the length of the belt will be automatically compensated for. Such changes may occur to a slight extent during operation in view of the fact that the belt stretches to some extent. In view of the large lever arm between the linkage point 32' of the rocker 4 on the transmission housing and the straight connecting lines between the central lines of the output shaft 23 of motor 2 and the input shaft 25 of the transmission 26, a slight yieldability of spring 33 will suffice to compensate for changes which in view of the stretching of the belt will occur between the motor 2 and the transmission housing 3 in the driving position.

In the transmission housing 3 parallel to the input shaft 25 and at the same level with the latter there is provided a shaft 36. Mounted on the shaft 36 is a gear 38 which is connected to a sprocket wheel 37. Gear 38 meshes with a gear rotatably journalled on shaft 25 and connected to a sprocket wheel 40. The sprocket wheels 37, 40 are located in the longitudinal central plane of the transmission 26 and are through chains 41 drivingly connected to sprocket 43 on sections 42 of shafts 5 which sections are journalled in the lower region of the transmission housing 3. Shafts 5 are driven by the sprocket wheels 43. The sections 42 are journalled in bushing-shaped extensions 44 of the transmission housing 3 which are laterally adjacent to the housing 3. The drive of the gears 38, 39 which mesh with each other and support the sprocket wheels 37, 40 is effected from the input shaft 25 through a pinion 45 which is mounted on shaft 25 and which meshes with a gear 46. Gear 46 is mounted on a shaft 47 which is located nearly centrally above the shafts 25 and 36. From shaft 47 the drive is transmitted through a pinion 48 to the gear 39.

The overload safety device located within the transmission 26 in conformity with the invention is formed by the gear 46 which will now be described in connection with FIGS. 10 and 11. As shown in FIG. 10, the gear 46 has a hub body 49 provided with a collar 49'. The gear ring 50 of the gear 46 is mounted on the collar 49 and is secured against axial displacement on said collar 49' on one side by a shoulder 51 of collar 49' which engages a corresponding annular recess of the gear ring 50. On the opposite side there is provided a plate 52 which is secured by screws or the like on one hand relative to the gear ring and on the other hand relative to the collar 49' of the hub body in any convenient manner, as by a collar or shoulder on the shaft carrying the gear 46. The collar 49' has a number of radial bores 53 adapted to receive balls 55 which are radially loaded toward the outside by springs 54. These balls 55 have at the inner circumference of the gear ring 50 semicircular recesses 56 associated therewith. The depth of these recesses 56 equals or is less than half the ball diameter which corresponds substantially to the diameter of the bores 53. In conformity with the strength of the springs 54, the gear ring 50 is up to a certain torque non-rotatably fixed relative to the hub body. If this torque is exceeded, the power counteracting the spring 54 and acting upon a ball 55 will overcome the spring force so that the balls are pressed back into bores 53, and the gear ring will rotate relative to the hub body 49. When the torque drops again, the balls 55 will in view of the load exerted thereupon by spring 54 automatically return to their locking position, and the interruption of the power flow is terminated.

The shafts 5 which carry the hoe tools 6 have, in conformity with the showing of FIG. 8, a central section which is mounted on the transmission housing 3 and provided with sprocket wheel 43. This section is followed by further sections 57 which similar to the section 42 are designed hollow and are held together by an axial bracing. The non-rotatable anchoring of the sections 57 with regard to each other and relative to the section 42 is effected by protruding noses 58 at one end of a section. Opposite said noses 58 at the other section there are provided recesses 59 of a corresponding size so that a positive engagement will be obtained. The interfitting projections 58 and recesses 59 provide a drive for shaft 5 through the section 57, as may be seen in FIG. 12.

The axial bracing of the individual sections 57 of shafts 55 with regard to each other and with regard to the intermediate section 42 is, in conformity with the present invention, effected in a particularly advantageous manner by a tie rod 60 which is preferably formed by a steel rod, a spring steel bar or also a cable. As tensioning elements 61 there may be employed nuts 61 as shown in FIG. 12.

According to a still further development of the present invention it has been found advantageous yieldably to tension the shaft in axial direction, for instance, by interposing spring elements 62. As spring elements 62 there may be employed dish springs 63 which are combined into spring packets and are arranged between the tensioning elements 61 and the shaft ends. Within the frame work of the present invention it is also possible to provide spring elements 62 at another point, or to design the tie rod resiliently yieldable. The illustrated construction, however, is characterized by its particular simplicity.

As hoe tools 6 in the embodiment (see particularly FIGS. 12–15) shown there are employed substantially U-shaped spring steel yokes 63 of flat material. The web 65 of yoke 64 has centrally located an oblong hole 66 the length of which corresponds to the outer distance between the diametrially oppositely located noses 58 of the shaft sections and thereby to the diameter of the shafts 5. The width of the oblong holes 66 is selected in conformity with the width of the noses 58. In this way, the spring steel yokes employed as hoe tools may, when assembling the shaft, be placed between the individual shaft sections and may be arrested thereby in the longitudinal direction of the shaft. In this connection, however, it is also possible so to design the hoe tools, in other words the spring steel yokes, in their tensioning area with the shaft that they form dish springs, and the spring elements will be contained in the blades. This brings about a particularly favorable construction. The non-rotatable arresting of the spring steel yokes is effected by means of the noses 58. At the shaft ends there is only one such spring steel yoke provided which forms the hoe tool. Otherwise, two of such U-shaped spring steel yokes are arranged together so that the webs 65 will extend relative to each other at an angle of 90° and that their legs 67 will point to opposite sides. The legs 67 of the spring steel yokes 64 extend approximately at an angle 68 of 110° to the web 65. The length of each leg 67 corresponds to half the length of the web 65.

The legs 67 which start from the web 65 and extend at an incline outwardly, are as is particularly clearly shown in FIG. 15 radially inwardly arched, in other words, in a concave manner toward the shaft whereby during the wear a self-sharpening effect is obtained. Additionally, the legs 67 of the spring steel yokes 64 are, as shown in FIG. 3, slightly inclined with regard to a tangent to the direction of rotation, and more specifically, in conformity with the type of work in the direction of rotation or opposite to the direction of rotation. This angle to the tangent is preferably of such magnitude that the legs which have approximately uniform width over the entire length with their rearward and outer edges (when viewing the direction of rotation of the hoeing tools) are located near the longitudinal central plane of the web 65.

A hoe according to the present invention can without an adjustment of the tools or a reversal from one direction of rotation to another direction of rotation be controlled as to its working direction solely by the handle means by subjecting the hoe tools moving through the ground to a greater extent and to thereby cause said hoe tools as the case may be deeper to penetrate the soil than the hoe tools rotating in the working direction. In view of this simple determination of the working direction, and above all, in view of the feeding speed, the hoe according to the present invention can easily be operated. In addition thereto, the hoe according to the invention is self-cleaning and therefore is free from disorders and will not clog up. In view of the outlined design of the shafts, the hoe according to the invention is nonsensitive with regard to coarse rocks or the like, inasmuch as the shafts can elastically evade such rocks.

In addition to the above outstanding features of the invention, the hoe according to the invention is furthermore characterized in that it is possible with said hoe in view of the simple reversing of the working direction merely by lifting or lowering the handle means to hoe any time in forward direction or rearward direction. Moreover, the hoe according to the invention may be turned on the spot and may pass through curves without the necessity of having the control handle means pivoted toward the side.

A further important advantage of the hoe according to the invention consists in that without difficulties a uniform working depth and a uniform relatively high working speed may be maintained which latter is within the range of from 0.8 to 1.2 meters per second. The hoe according to the invention is also relatively light since it has a relatively low power consumption, and consequently, can be equipped with a light motor. This, in turn, assures low cost of operation.

In view of the above outlined properties of the hoe according to the invention, the hoe is particularly suitable as nursing hoe when only the upper soil layer up to a depth of approximately three centimeters is worked. The hoe is very effective in destroying weeds and in loosening up the soil, and can easily be guided and operated.

With regard to FIGS. 16 to 18 illustrating a hoe tool according to the invention of spring steel, similar to the tool of FIGS. 13 to 15, it will be seen that the tool in the direction of its legs 67a forms a cup-shaped convexity so that two hoe tools mounted back to back and connected to the shaft while being braced against each other will in their central area practically form a spring box by means of which the elasticity desired in the longitudinal direction of the shaft will be obtained. The central area is provided with the oblong opening 66a for firmly connecting the tool to the shaft.

It is, of course, to be understood that the present invention is, by no means, limited to the particular showing in the drawings, but also comprises any modifications within the scope of the appended claims.

What I claim is:

1. A motor operated hand hoe with two parallel shaft means spaced from each other as journalled in a hoe housing and motor means supported by said housing above said shaft means, in which said shaft means comprises a first shaft having rotary blade means constituting soil-working tools mounted thereon, a second shaft having rotary blade means constituting soil-working tools mounted thereon and associated with said first shaft and extending parallel thereto, said first and second shafts being spaced longitudinally and being transverse to direction of operation, said tools supporting said hoe on the ground, and means operatively connecting said motor means to said first and second shafts to rotate the same simultaneously in opposite directions with regard to each other, and rearwardly extending handle means to guide and manually tilt said hoe about a transverse horizontal axis to shift and vary the weight alternately on the two shafts to drive the hoe in opposite directions selectively at a rate varying with the angle of tilt, respectively, and thereby determining the load exerted by one shaft and the tools supported thereby upon the soil with regard to the load exerted by the other shaft and through the tools thereof upon the soil for controlling the particular advancing movement of the hoe, said tools having an overlapping circular path movement.

2. A hoe according to claim 1, in which working tools located in pairs coplanar as arranged to be synchronously driven on the shaft means are spaced serially with respect to the particular direction of movement and also serve as sole carriers of the hoe.

3. A hoe according to claim 1, which includes handle means rotatable around a longitudinal axis thereof with respect to the hoe housing, a guide sleeve therefor and pivot connection connected to move with the hoe housing so that turning of said handle means around its longitudinal axis varies angular position in plan view between the longitudinal axis of said handle means and said shafts transverse to particular direction of movement at that instant.

4. In combination, a motor operated hand hoe with shaft means and motor means mounted on said hoe above said shaft means, in which said shaft means comprises a first shaft having rotary blade means constituting soil-working tools mounted thereon and associated with said first shaft and extending parallel thereto, said first and second shafts being spaced longitudinally and transverse to direction of operation, said tools being located in pairs in planes perpendicular to the plane of the axes of said shafts with the paths of movements of said tools on said shafts overlapping each other and supporting said hoe on the ground, and means operatively connecting said motor means to said first and second shafts to rotate the same simultaneously in opposite directions with regard to each other, and rearwardly extending handle means to tilt said hoe about a transverse horizontal axis to vary the weight on the two shafts, respectively, and thereby the load exerted by one shaft and the tools supported thereby upon the soil with regard to the load exerted by the other shaft and through the tools thereof upon the soil for controlling the advancing movement of the hoe.

5. A hoe in combination according to claim 4, in which the tools connected to said shafts operate as sole supporting means for said hoe on the ground during the soil working of said hoe, the center of gravity of said hoe when viewed with respect to a transverse middle plane symmetrically from the top being located between the shafts carrying said hoe tools.

* * * * *